No. 741,076. PATENTED OCT. 13, 1903.
W. F. SHEPPARD.
CONVERTIBLE HARROW AND CULTIVATOR.
APPLICATION FILED OCT. 27, 1902.
NO MODEL. 2 SHEETS—SHEET 1.
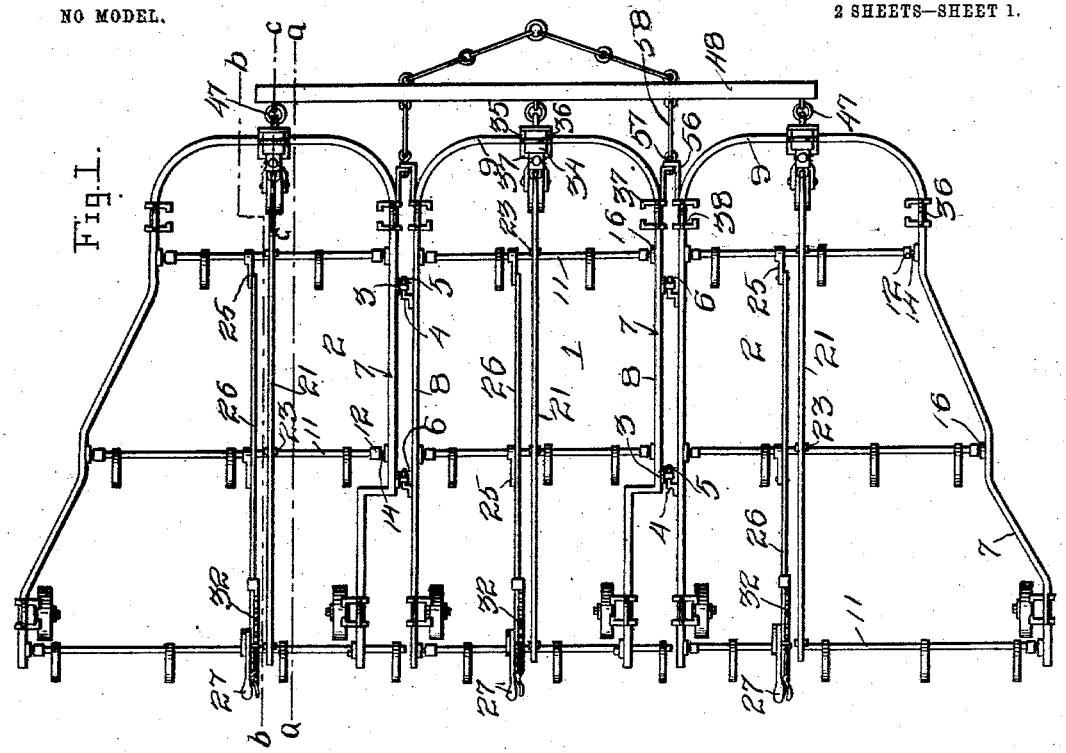
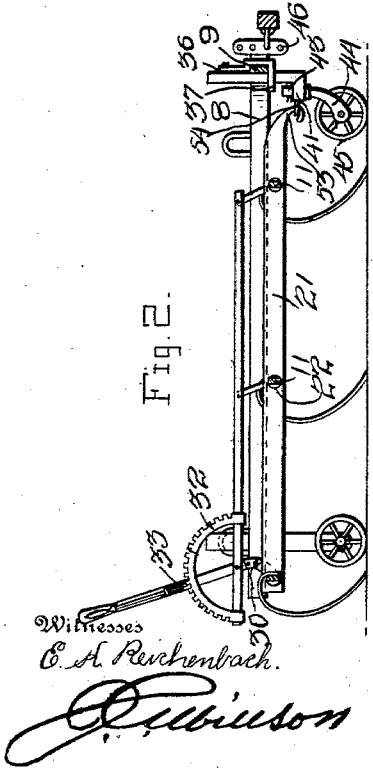
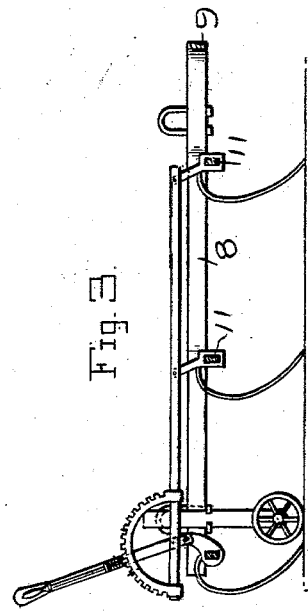
Witnesses
E. A. Reichenbach.
Inventor
W. F. Sheppard.
By H. B. Willson & Co.
Attorneys

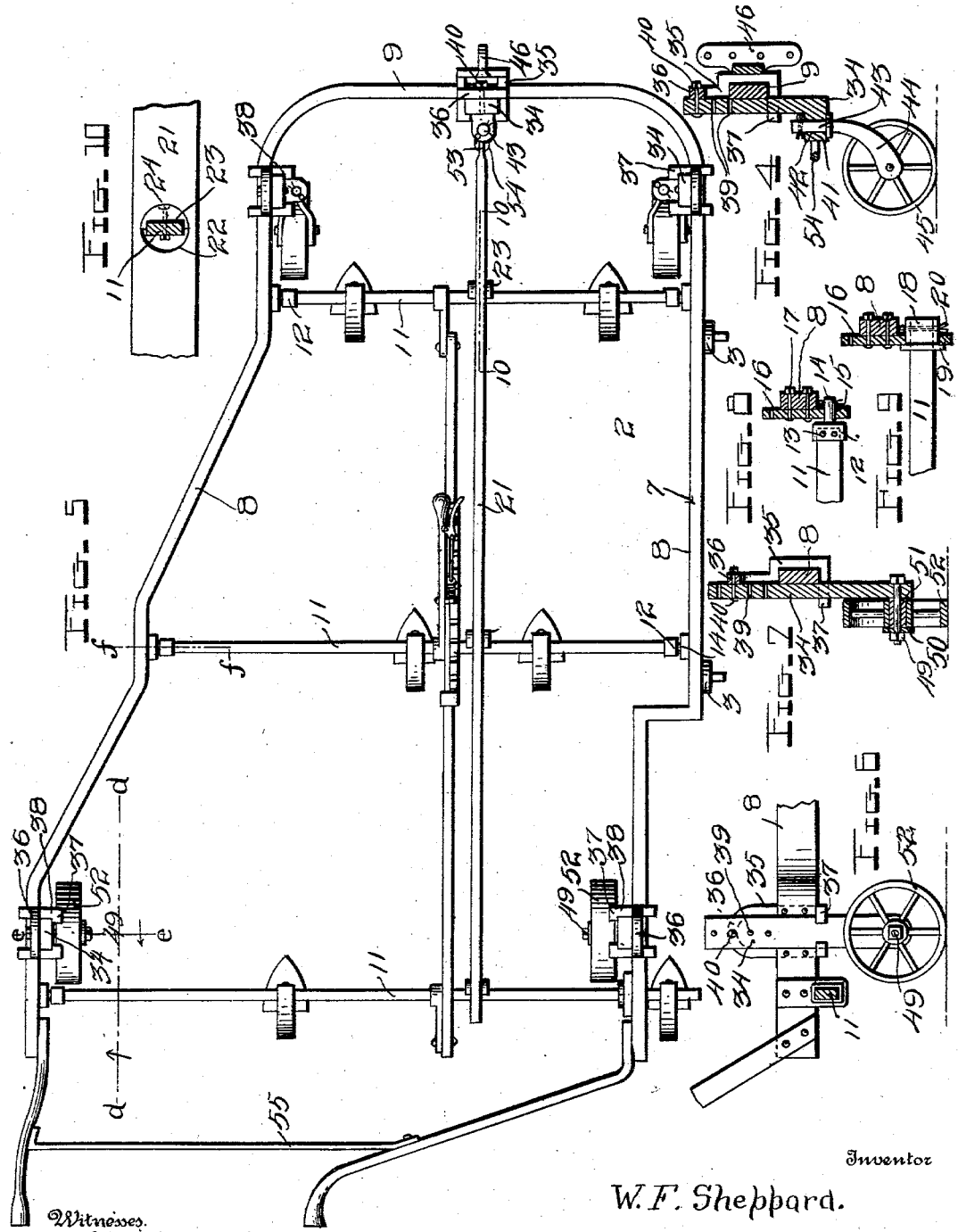

No. 741,076. Patented October 13, 1903.

UNITED STATES PATENT OFFICE.

WILLIAM F. SHEPPARD, OF WASHINGTON, DISTRICT OF COLUMBIA.

CONVERTIBLE HARROW AND CULTIVATOR.

SPECIFICATION forming part of Letters Patent No. 741,076, dated October 13, 1903.

Application filed October 27, 1902. Serial No. 128,962. (No model.)

*To all whom it may concern:*

Be it known that I, WILLIAM F. SHEPPARD, a citizen of the United States, residing at Washington, in the District of Columbia, have invented certain new and useful Improvements in a Convertible Harrow and Cultivator; and I do declare the following to be a full, clear, and exact description of the invention, such as will enable others skilled in the art to which it appertains to make and use the same.

My invention is an improved convertible harrow and cultivator; and it consists in the peculiar construction and combination of devices hereinafter fully described and claimed.

In the accompanying drawings, Figure 1 is a top plan view of an implement embodying my improvements, showing the same provided with spring harrow-teeth. Fig. 2 is a longitudinal sectional view of the same, taken on the plane indicated by the line $a\ a$ of Fig. 1. Fig. 3 is a similar view taken on the plane indicated by the line $b\ b$ of Fig. 1. Fig. 4 is a detail sectional view taken on the plane indicated by the line $c\ c$ of Fig. 1. Fig. 5 is a top plan view of one section of my improved implement, showing the same provided with cultivator-teeth and also provided with handles whereby it may be used for the purposes of a cultivator. Fig. 6 is a detail sectional view taken on the plane indicated by the line $d\ d$ of Fig. 5. Fig. 7 is a similar view at right angles to Fig. 6 and taken on the plane indicated by the line $e\ e$ of Fig. 5. Fig. 8 is a detail sectional view taken on the plane indicated by the line $f\ f$ of Fig. 5 and illustrating the construction of one of the bearings for one of the transversely-disposed rock-shafts which carry the cultivator or harrow teeth. Fig. 9 is a similar view showing a modification thereof; and Fig. 10 is a detail view of one of the brace-bars, also showing a bearing for one of the rock-shafts which carry the harrow or cultivator teeth.

In the embodiment of my invention here shown I provide a plurality of frames 1 2, the former being disposed between the latter and the said frames being provided on their opposing sides with coacting pivotal brackets 3 and pintle-brackets 4. The pintles 5 of the brackets 4 are adapted to be placed in the openings in the brackets 3, whereby pivot or hinge joints may be formed between the section-frames, and the pintles of the brackets 4 are further provided with keys or linchpins 6 to keep them in engagement with the brackets 3 and prevent accidental detachment of the section-frames. It will be understood that this construction and arrangement of devices enables either or both of the outer frames 2 to be upturned and folded on the center frame 1.

Each of the section-frames of my convertible implement comprises a bar 7, which is bent to form the integral side bars 8 and the front connecting-bar 9. The side bars 8 of the central or inner section-frame are parallel with each other. In the form of my invention here shown the outer side bars of the outer section-frames 2 are obliquely disposed, so that the side bars of said outer section-frames converge forwardly; but this is optional, and I do not desire to limit myself in this particular. One of the side bars of two of the section-frames is provided at its rear end with a lateral inwardly-extending offset portion 10. Each of the section-frames is provided with a plurality of transversely-disposed rock-shafts 11, which have suitable bearings at their ends. These rock-shafts are angular in cross-section and in the form of my invention shown in Figs. 5 and 8 are provided at their ends with caps 12, which are detachably bolted thereto, as at 13, and are provided with trunnions or spindles 14 on their outer sides, the said trunnions or spindles engaging bearing-openings 15 in vertically-detachable bearing-brackets 16, which latter are secured to the inner sides of the side bars of the frame-sections by means of bolts 17. Each of these bracket-bearings is provided with a plurality of bolt-openings disposed in vertical series and at suitable distances apart, and hence the said bracket-bearings are vertically adjustable on the section-frames, as will be understood. Hence it is evident that the rock-shafts 11 may be raised or lowered with reference to the said section-frames.

In the modification shown in Fig. 9 I dispense with the brackets 12 and employ in lieu thereof cylindrical socket-caps 18, which are recessed to receive the ends of the rock-shafts 11, are journaled in bearing-openings in the vertically-adjustable bearing-brackets 16, are provided on their inner sides with annular flanges 19 to engage the inner sides of said brackets 16, and are provided at a suitable distance from their outer sides with transverse openings to receive pins or keys 20, which also pass through openings in the rock-shafts 11, near the outer ends thereof, to secure the said rock-shafts in the said socket-caps.

Each of the section-frames is further provided with a longitudinally-disposed brace-bar 21, having a plurality of circular openings 22 of suitable size to enable the rock-shafts 11 to extend therethrough. To each of the said rock-shafts are secured a number of semicircular bearing-blocks 23, which engage the openings 22 and are bolted to the said rock-shafts, as at 24 in Fig. 10. The function of these brace-rods 21, as will be understood, is to distribute the stress between the rock-shafts, and hence brace each of the rock-shafts. Preferably the brace-rods 21 are disposed midway between the sides of the section-frames, or substantially so; but this may be varied at discretion, and I do not limit myself in this particular, nor do I limit myself with reference to the number of said brace-rods employed in connection with each of the section-frames. The rock-shafts of each of the harrow-sections are here shown as provided with rock-arms and a link connecting them together, and I also show co-acting levers and rack segments to secure the rock-shafts, and hence the cultivator or harrow teeth carried thereby, at any desired adjustment.

In connection with each section-frame I employ a plurality of vertically-adjustable standards 34 and clamping guide-plates 35. The same are disposed on opposite sides of the bars of the section-frames. The plates 35 have lateral offsets 36 at their upper ends and lateral inwardly-extending guide-arms 37 at their lower ends, which guide-arms are rabbeted in their opposing inner sides, as at 38, to receive the vertical portions of the standards 34. The latter are provided each with a plurality of adjusting-openings 39. The bolts 40, which are employed to secure the standards 34 to the clamp-plates 35, may be disposed in either of the openings 39 to effect any desired vertical adjustment of the standards. The latter are provided at their lower ends with lateral offset portions 41. In such of the standards as are disposed at or near the front ends of the section-frames the said lateral offset portions 41 are provided with vertical openings 42, which form bearings for the spindles 43 of the forks 44, which carry the caster-wheels 45. Hence the latter may turn angularly with relation to the section-frames to enable the implement to be drawn in any direction and to be readily turned, as will be understood. Such of the plates 35 as are used on the front cross-bars 9 of the respective section-frames are provided with clevises 46. The latter are connected by suitable links 47 to a draw-bar 48 when a number of section-frames are coupled together, as hereinbefore described and as shown in Fig. 1. Such of the standards 34 as are disposed at or near the rear corners of the section-frames are provided with bolts 49 and washers 50. On said bolts between the said washers and the said standards are bushings 51, which form the bearings on which the rear wheels 52 rotate. The standards, which carry the supporting-wheels of the section-frames, as hereinbefore described, are vertically adjustable, and the rock-shafts, which carry the harrow or cultivator teeth, are also vertically adjustable, as hereinbefore stated, and the front ends of the brace-bars 21, which are carried by the said rock-shafts, are downturned somewhat and provided with hooks 53, which engage eyes or lugs 54, with which the front standards are provided, as shown in Figs. 1, 2, and 5.

In Fig. 5 of the drawings I show one of the frames provided at its rear end with handles 55, whereby it may be directed as required by the driver or operator.

Angle-irons 56 are shown in Fig. 1 bolted to the opposing sides of the section-frames near their front ends, having their overlapping front portions connected together by pivot-bolts 57 and links 58 connecting said pivot-bolts to the draw-bar 48.

From the foregoing description, taken in connection with the accompanying drawings, the construction, mode of operation, and advantages of the invention will be readily understood, it is thought, without requiring a more extended explanation.

Various changes in the form, proportion, and the minor details of construction may be resorted to without departing from the principle or sacrificing any of the advantages of my invention.

Having thus fully described my invention, what I claim as new, and desire to secure by Letters Patent, is—

1. In an implement of the class described, the combination of a frame, tooth-carrying rock-shafts, vertically-adjustable connections between the latter and the frame, a vertically-adjustable wheel, a carrying-standard and a brace-rod connecting the said rock-shafts and connected to the said standard, substantially as described.

2. In an implement of the class described, the combination with a frame member, of a standard on one side thereof, a clamping-plate engaging the opposite side of the frame member and having guide-arms engaging said standard, and means to adjustably secure the latter to said clamping-plate, substantially as described.

3. In an implement of the class described, the combination of a frame member, a standard on one side of said frame member bearing against the same and provided with adjusting-openings, a clamping-plate on the opposite side of the frame member having a vertically-extended portion to bear against the standard and laterally-extended guide-arms engaging the latter, said extension of said guide-arms being on opposite sides of the frame member, and an adjusting-bolt to secure said standard to the vertical extension of said clamping-plate, substantially as described.

In testimony whereof I have hereunto set my hand in presence of two subscribing witnesses.

WILLIAM F. SHEPPARD.

Witnesses:
 BENJ. G. COWL,
 ROY C. HEFLEBOWER.